United States Patent
Atzler et al.

(10) Patent No.: US 8,171,914 B2
(45) Date of Patent: May 8, 2012

(54) METHOD FOR REDUCING POLLUTANT EMISSIONS AND CONSUMPTION OF AN ENGINE

(75) Inventors: Frank Atzler, Dettenhofen (DE); Oliver Kastner, Donaustauf (DE); Andreas Weigand, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 319 days.

(21) Appl. No.: 12/440,892

(22) PCT Filed: Aug. 30, 2007

(86) PCT No.: PCT/EP2007/059054
§ 371 (c)(1),
(2), (4) Date: Mar. 11, 2009

(87) PCT Pub. No.: WO2008/031727
PCT Pub. Date: Mar. 20, 2008

(65) Prior Publication Data
US 2010/0037861 A1 Feb. 18, 2010

(30) Foreign Application Priority Data
Sep. 12, 2006 (EP) ................................... 06019052

(51) Int. Cl.
*F02M 7/00* (2006.01)
*F02M 25/07* (2006.01)
*F02D 41/30* (2006.01)
(52) U.S. Cl. .................... 123/435; 123/568.11; 701/103
(58) Field of Classification Search .................. 123/319, 123/398, 400; 56/11.3, 11.4, 11.7, 10.8, 56/239–243
See application file for complete search history.

(56) References Cited

U.S. PATENT DOCUMENTS

| | | | | |
|---|---|---|---|---|
| 5,992,385 A * | 11/1999 | Hess et al. | ............... | 123/406.23 |
| 6,564,556 B2 * | 5/2003 | Ginter | ............... | 60/775 |
| 6,951,197 B2 * | 10/2005 | Wagner et al. | ............... | 123/295 |
| 7,225,791 B2 * | 6/2007 | Blessing et al. | ............... | 123/299 |
| 7,418,335 B2 * | 8/2008 | Barnes et al. | ............... | 701/103 |

(Continued)

FOREIGN PATENT DOCUMENTS

DE 102004052415 A1 7/2005

(Continued)

OTHER PUBLICATIONS

International Search Report, PCT/EP2007/59054, 11 pages, Oct. 24, 2007.

*Primary Examiner* — John T. Kwon
*Assistant Examiner* — Johnny Hoang
(74) *Attorney, Agent, or Firm* — King & Spalding L.L.P.

(57) ABSTRACT

To reduce pollutant emissions and consumption of passenger cars diesel engines multiple injection strategies are applied. Assuming constant cylinder and bowl geometry and constant rail pressure the variation of the number of injections, injection quantity of each injection and separation between two consecutive injections are the major parameters to be optimised. Furthermore, a single injection is applied with a shaped injection rate by a rise in injection pressure, equal to that observed in cam controlled injection systems. The needle lift can be modified for piezo driven common rail injection systems.
Both methods are compared in terms of pollutant emission, fuel consumption and robustness. Experiments were carried out on single cylinder research engines. Multiple injection strategies with large hydraulic dwell times were compared with a short dwell setting simulating a "rate shaped" single injection. Rate shaping was implemented performing multiple injections with hydraulic dwell times close to or equal zero.

14 Claims, 13 Drawing Sheets

U.S. PATENT DOCUMENTS

| | | | |
|---|---|---|---|
| 7,464,689 B2 * | 12/2008 | Siewert | 123/299 |
| 7,467,615 B2 * | 12/2008 | Siewert | 123/299 |
| 2003/0014959 A1 * | 1/2003 | Ginter | 60/39.26 |
| 2005/0224044 A1 * | 10/2005 | Stojkovic et al. | 123/299 |
| 2005/0274352 A1 * | 12/2005 | Canale et al. | 123/299 |
| 2006/0064986 A1 * | 3/2006 | Ginter et al. | 60/775 |
| 2007/0079798 A1 * | 4/2007 | Siewert | 123/299 |
| 2007/0272203 A1 * | 11/2007 | Sloane et al. | 123/295 |
| 2007/0277786 A1 * | 12/2007 | Barnes et al. | 123/478 |
| 2008/0072872 A1 * | 3/2008 | Siewert | 123/299 |
| 2008/0283006 A1 * | 11/2008 | Sutherland et al. | 123/90.15 |
| 2010/0037861 A1 * | 2/2010 | Atzler et al. | 123/435 |

FOREIGN PATENT DOCUMENTS

| | | |
|---|---|---|
| EP | 1541644 A1 | 6/2005 |
| EP | 1607609 A1 | 12/2005 |
| EP | 1681453 A2 | 7/2006 |
| JP | 2000110654 A | 4/2000 |

* cited by examiner

FIG 1A
FIG 1B
◆ 2 injections: P1-M1;
● 3 injections: P1-P2-M1
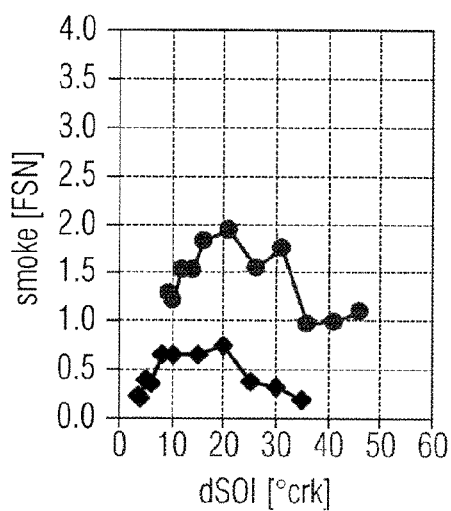
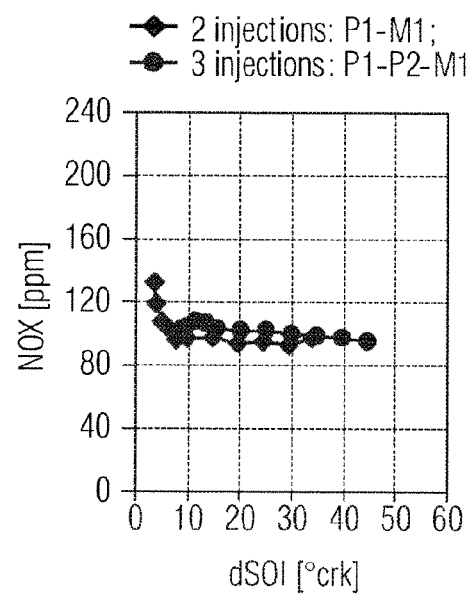
FIG 1C
FIG 1D
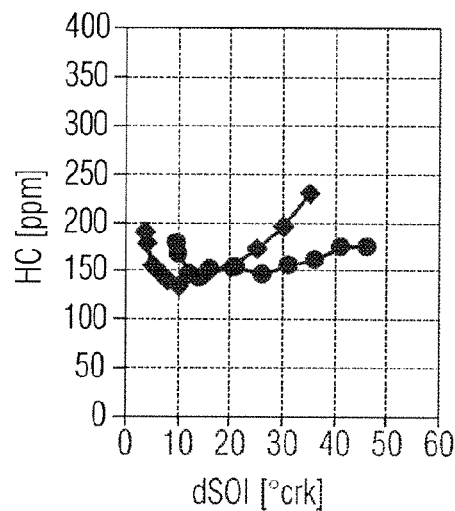
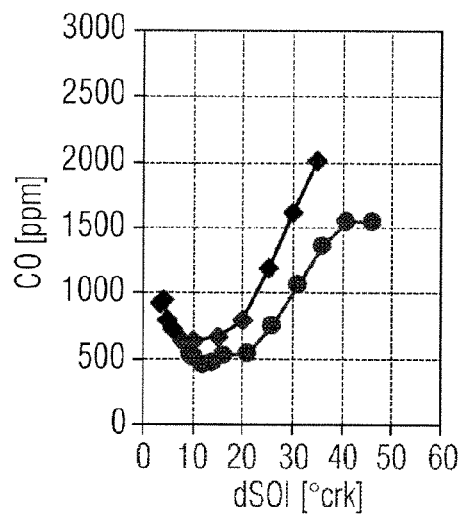

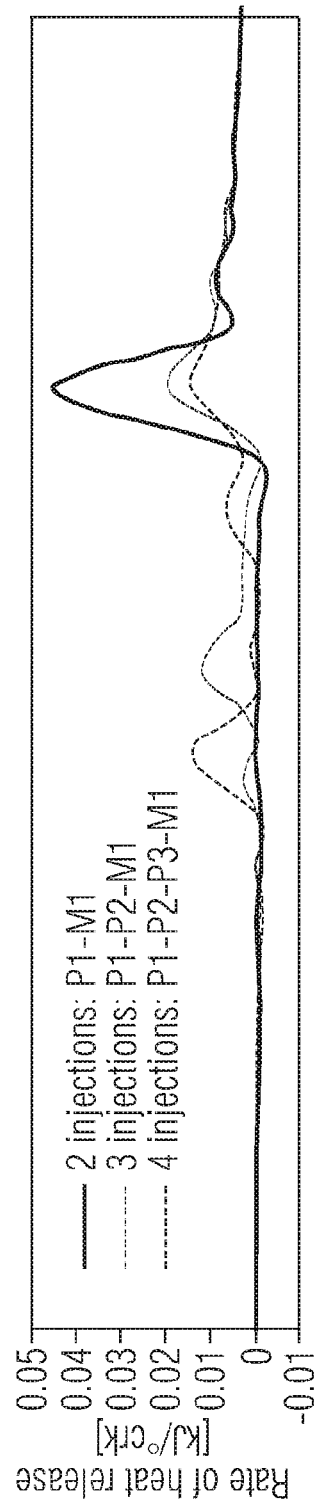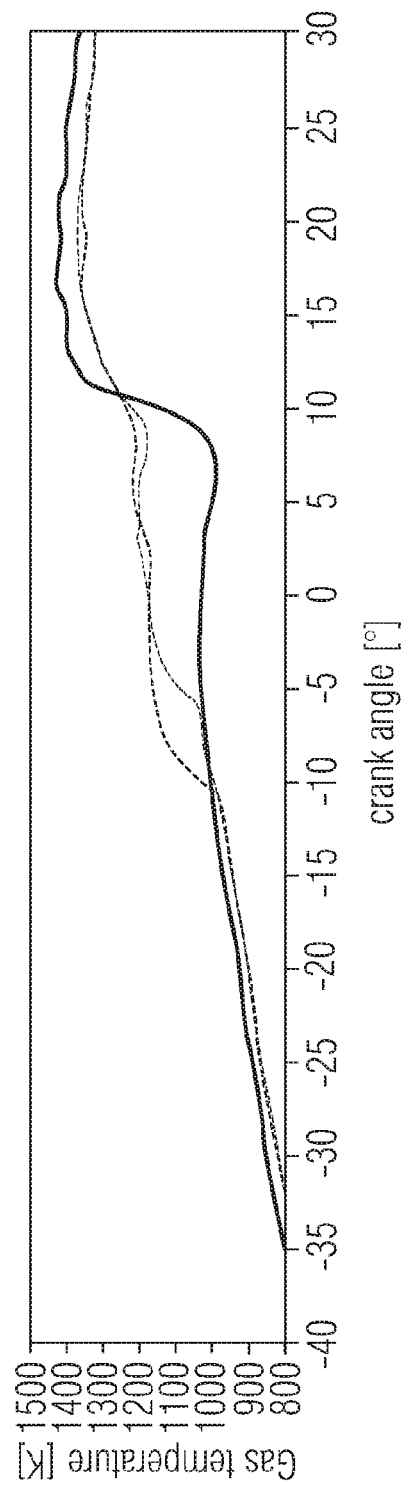

→ 3 injections: small pilot quantities
→ 3 injections: large pilot quantities

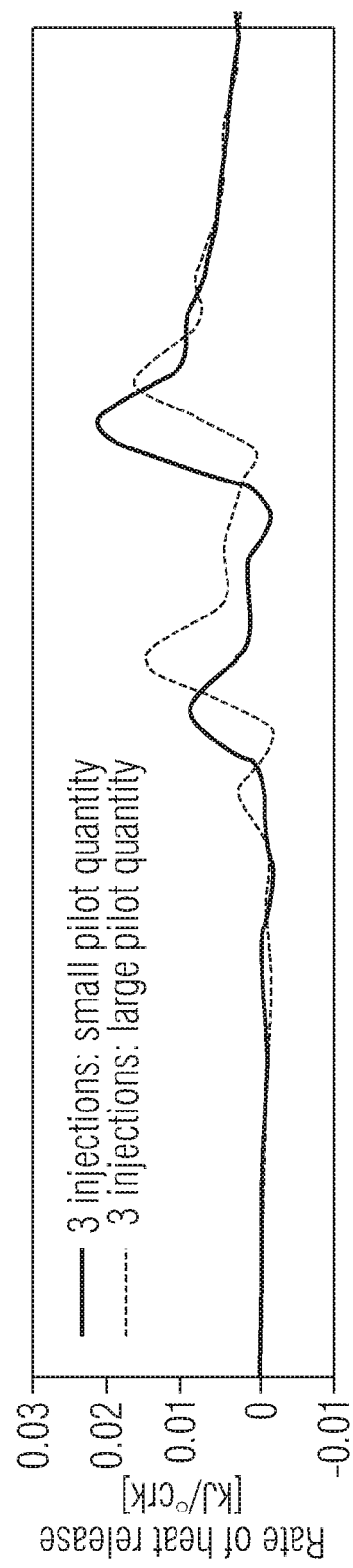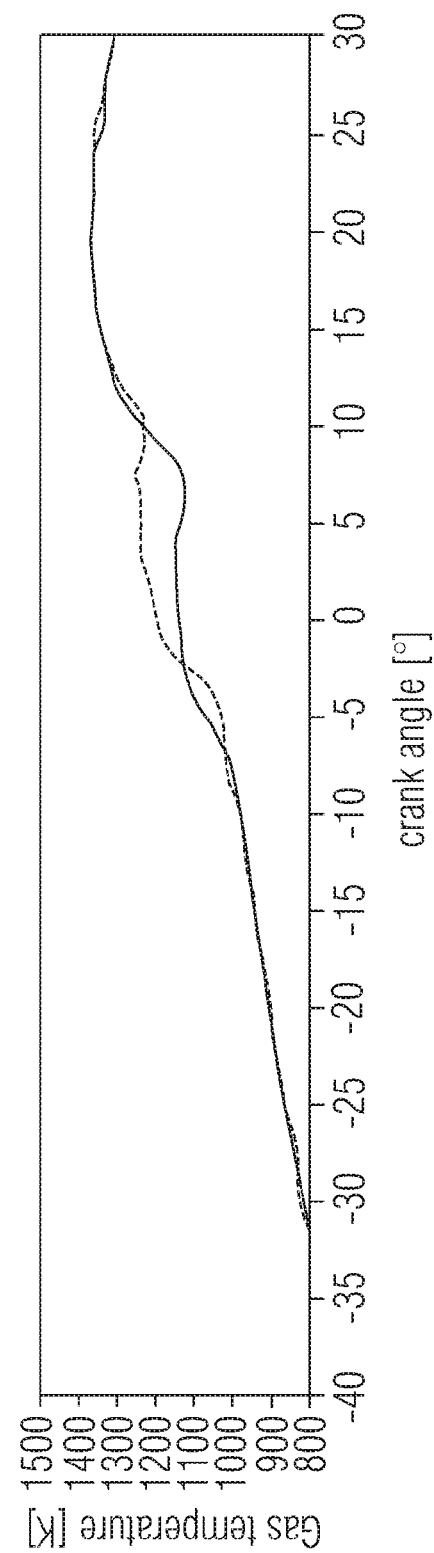

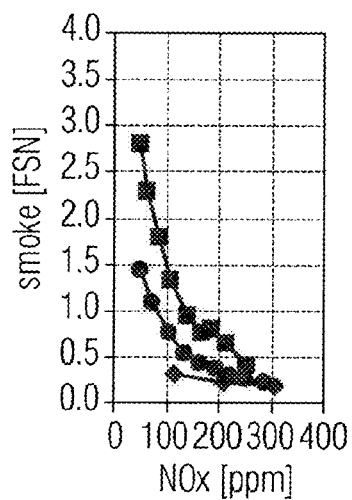
FIG 7A
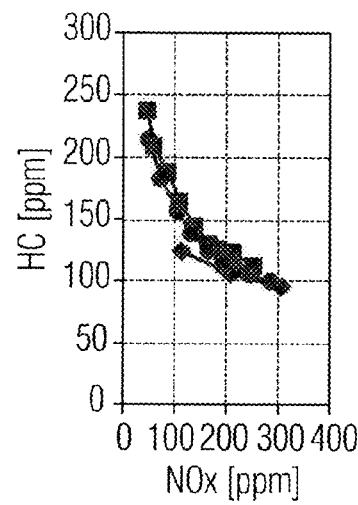
FIG 7B
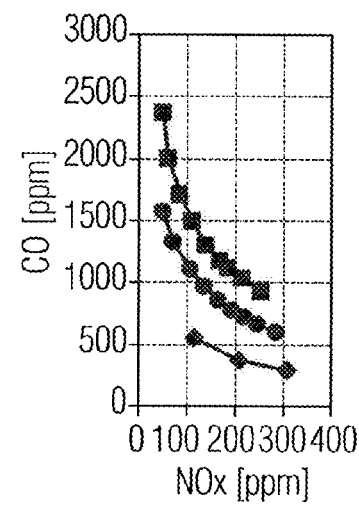
FIG 7C
FIG 7D
◆ 2 injections: P1-M1
● 3 injections: P1-P2-M1
■ 4 injections: P1-P2-P3-M1
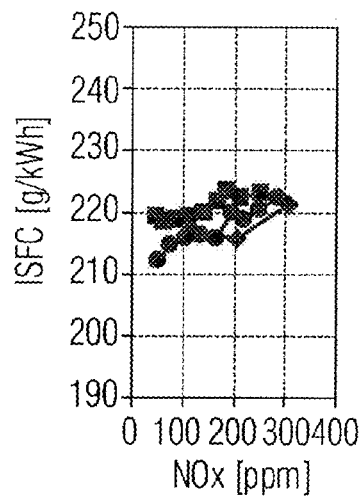
FIG 7E
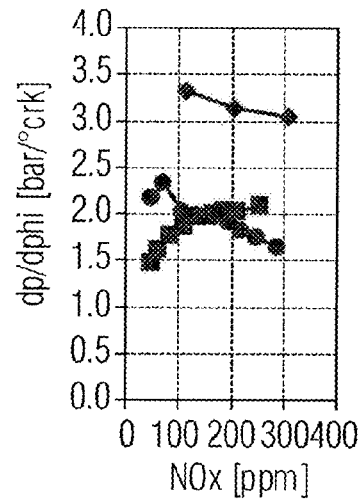

- ♦ 2 inj; Zero dwell
- ● 3 inj; Zero Dwell
- ■ 4 inj; Zero Dwell
- ▲ 2 inj; Large dwell
- + 3 inj; Large dwell

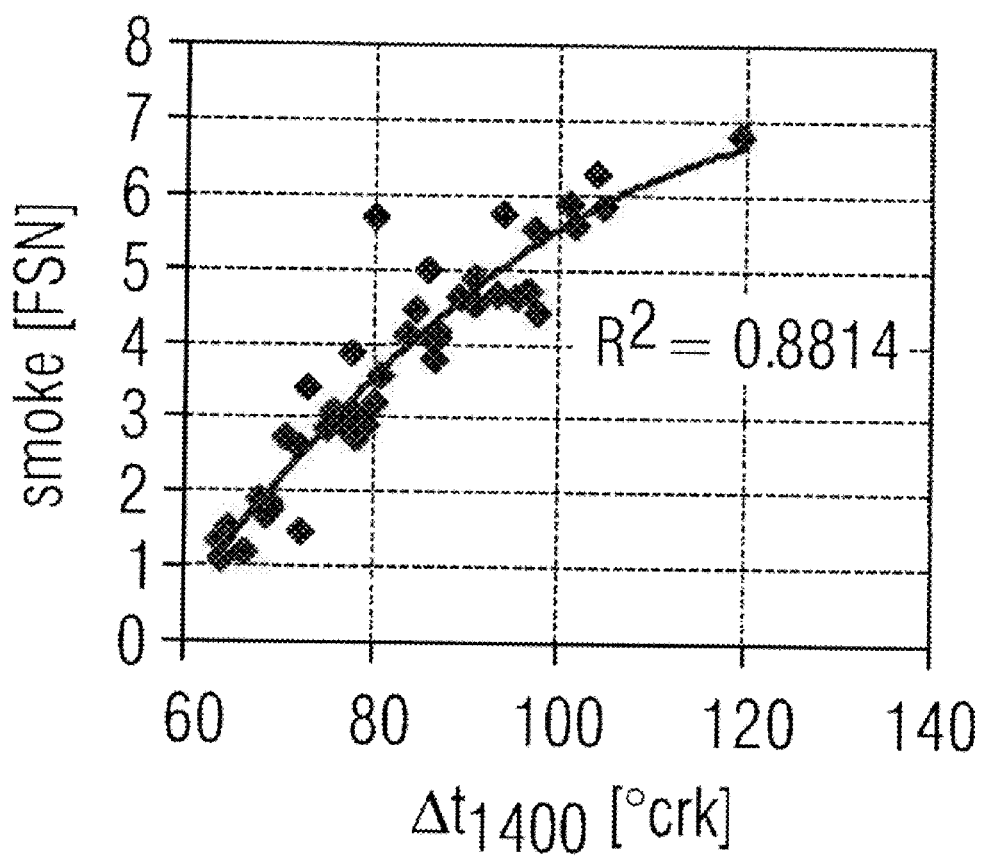

METHOD FOR REDUCING POLLUTANT EMISSIONS AND CONSUMPTION OF AN ENGINE

CROSS-REFERENCE TO RELATED APPLICATIONS

This application is a United States national phase filing under 35 U.S.C. §371 of International Application No. PCT/EP2007/059054, filed Aug. 30, 2007, which claims priority to European Patent Application No. 06019052, filed Sep. 12, 2006.

TECHNICAL FIELD

The present application concerns a method for reducing pollutant emissions and consumption of an engine.

BACKGROUND

Combustion engines for passenger cars have to fulfil a large number of requirements. These include emissions and noise legislation, good fuel economy as well as drivability and comfort issues. Future emissions legislation will further tighten the limits of the emissions of nitrous oxides, NOx, hydrocarbon compounds, HC, carbon monoxide, CO and particulate matter, PM, measured in steady state as well as dynamic tests.

As a result, it will be necessary to provide engine components, e.g. valves for exhaust gas recirculation (EGR), turbo chargers, injectors and nozzles, as well as the sensors, the computing capacity and the appropriate algorithms to precisely meter air, recirculated exhaust gas (EGR) and fuel, not only at steady state but also at transient conditions of engine load and speed.

One of the key technologies for the development of novel combustion processes are advanced injection strategies. Precise and repeatable metering of smallest quantities of fuel as well as excellent atomisation at different engine operating conditions are only some requirements for these strategies.

Up to five injections per cycle, with hydraulic dwell times between zero and some 30 degrees crank angle, are supposed to reduce pollutant emissions and at the same time yield acceptable fuel consumption. It is believed that in order to obtain a strong reduction of smoke as well as NOx emission in part load, 4 injections instead of 2 should be applied.

Single injections with an optimised rate shape might be an alternative. In part load, NOx emissions were found to be reduced best for boot and least for square shaped injections, assuming a constant crank angle position of 50% heat release (HR50). Smoke emissions were minimal at ramp and increase towards square and boot. At low engine speeds and high loads only minor benefits could be obtained for the boot shaped injection.

For piezo driven common rail systems, the boot shaped injection can possibly be achieved by using several consecutive injections with very small or even negative hydraulic dwells. These dwells can be realised, since the piezo actuator can be energised immediately after the de-energising of the previous injection. This enables the re-opening of the nozzle needle at the end or even during the closing phase of the preceding injection. This however includes the risk, that atomisation might deteriorate, due to the multiple opening sequences of the nozzle needle.

SUMMARY

According to various embodiments, an alternative method for reducing pollutant emissions and consumption of an engine is disclosed.

According to an embodiment, a method for reducing pollutant emissions and consumption of an engine may comprise the step of controlling the dwell time between a first injection and a second injection such that the mean gas temperature of the combustion chamber of said engine is minimized before the ignition of the second injection.

According to a further embodiment, mean gas temperature may be calculated from a time dependent pressure signal in the combustion chamber and the corresponding volume of said combustion chamber. According to a further embodiment, the pressure signal may be delivered by a pressure sensor arranged in the combustion chamber of said engine. According to a further embodiment, the second injection may be the main injection. According to a further embodiment, engine parameters can be controlled such that the maximum gas temperature in the combustion chamber and/or the duration at the maximum gas temperature is optimized. According to a further embodiment, the engine parameters may be EGR-rate, amount of injection per cycle, fuel amount and injection timing.

BRIEF DESCRIPTION OF THE DRAWINGS

Embodiments of the method for reducing emissions and consumption and examples of the present invention will now be more particularly described with reference to the accompanying schematic drawings, in which:

FIG. 1A a graph showing smoke over dwell,
FIG. 1B a graph showing $NO_x$ over dwell,
FIG. 1C a graph showing HC over dwell,
FIG. 1D a graph showing CO over dwell,
FIG. 2A a graph showing the injector current over the crank angle,
FIG. 2B a graph showing the rate of heat release over the crank angle,
FIG. 2C a graph showing the gas temperature over the crank angle,
FIG. 3A a graph showing smoke over dwell,
FIG. 3B a graph showing $NO_x$ over dwell,
FIG. 3C a graph showing HC over dwell,
FIG. 3D a graph showing CO over dwell,
FIG. 4A a graph showing the rate of heat release over the crank angle,
FIG. 4B a graph showing the gas temperature over the crank angle,
FIG. 5A a graph showing smoke over dwell,
FIG. 5B a graph showing $NO_x$ over dwell,
FIG. 5C a graph showing HC over dwell,
FIG. 5D a graph showing CO over dwell,
FIG. 6A a graph showing the rate of heat release over the crank angle,
FIG. 6B a graph showing the gas temperature over the crank angle,
FIG. 7A a graph showing the smoke over $NO_x$,
FIG. 7B a graph showing HC over $NO_x$,
FIG. 7C a graph showing CO over $NO_x$,
FIG. 7D a graph showing ISFC over $NO_x$,
FIG. 7E a graph showing combustion noise over $NO_x$,
FIG. 8A a graph showing the smoke over HR50° (position of the point of 50% heat release after top dead center),
FIG. 8B a graph showing the $NO_x$ over HR50°,
FIG. 8C a graph showing the combustion noise over HR50°,
FIG. 9A a graph showing the rate of heat release over the crank angle for constant $NO_x$,
FIG. 9B a graph showing the cylinder pressure over the crank angle for constant $NO_x$, FIG. 9C a graph showing the gas temperature over the crank angle for constant $NO_x$, FIG. 9D a graph showing the rate of heat release over the crank angle with a three-injections-setting, FIG. 9E a graph showing the cylinder pressure over the crank angle with a three-injections-setting, FIG. 9F a graph showing the gas temperature over the crank angle with a three-injections-setting, FIG. 10A a graph showing the smoke over HR50° at zero EGR-rate, FIG. 10B a graph showing the $NO_x$ over HR50° at zero EGR-rate, FIG. 10C a graph showing the combustion noise over HR50° at zero EGR-rate, FIG. 11A a graph showing the smoke over HR50° at a 20% EGR-rate, FIG. 11B a graph showing the $NO_x$ over HR50° at a 20% EGR-rate, FIG. 11C a graph showing the ISFC over HR50° at a 20% EGR-rate, FIG. 11D a graph showing the HC over HR50° at a 20% EGR-rate, FIG. 11E a graph showing the CO over HR50° at a 20% EGR-rate, FIG. 12 a graph showing the smoke over combustion period above 1400K in-cylinder gas temperature.

DETAILED DESCRIPTION

Figure 2A:
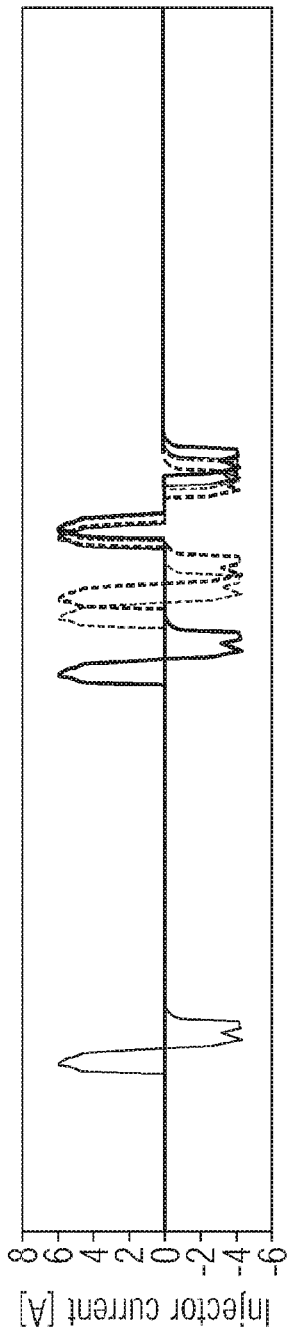

This present application particularly examines short but positive hydraulic dwell times in engine part load, where the start of the succeeding injection begins immediately after the end of the previous one.

Experimental Set Up and Methodology

A single cylinder engine was used for the present investigations. The basic engine data are listed in Table 1.

TABLE 1

| Basic engine data | |
|---|---|
| Cylinder volume/cm³ | 416 |
| Bore/mm | 78.3 |
| Stroke/mm | 86.4 |
| Compression ratio ϵ/— | 18 |
| Number of valves | 4 |
| Shape of combustion chamber | Ω-shape |

A piezo driven injector was equipped with a 6-hole micro-sac nozzle with a hydraulic efficiency of $\mu=0.77$. The cone factor and the factor for hydro erosive rounding of the nozzle hole where cf=2.5 and HE=16%, respectively. The hole exit diameter was $d_0=148$ μm and the hydraulic flow HF=370 mm³/30 s.

The investigations were carried out in a low load and a medium load point, where multiple injection strategies are supposed to be most beneficial. The low load point represents the ECE part of the NEDC (new european driving cycle), therefore it is named "ECE" in the following. The medium load point is obtained from the EUDC part of the NEDC cycle. Since it represents the acceleration phase during the EUDC part, it is named ACP (acceleration point). The Table 2 contains the detailed settings of both operating points.

TABLE 2

| Basic configurations of operating points | | | | | |
|---|---|---|---|---|---|
| Abbreviation | N/ rpm | imep/ bar | p_rail/ bar | EGR/ % | p_boost/ mbar |
| ECE | 1500 | 3.2 | 550 | 30 | 1220 |
| ACP | 2280 | 9.9 | 1600 | 20 | 1700 |

The main parameters for the evaluation of the results were the emissions of $NO_x$, PM, HC and CO, the fuel consumption ISFC and the combustion noise dp/d☐. The presented results comprise the investigations of injection pattern, where number of injections and individual injection quantities were varied. The two above mentioned strategies, "Large dwell" and "Short dwell" were investigated and compared considering the pollutant emissions, consumption and noise.

The separation angle leading to a hydraulic dwell time of zero between two consecutive injections was obtained experimentally, which will be explained shortly for a two injections setting. Therefore, the engine was run at constant load and constant HR50. The quantity of the first injection was kept constant. The first injection was moved from large dwells towards the second injection. When the first injection approached the second one, the energizing time of the second injection had to be decreased drastically, when the dwell zero separation angle was reached. This was the case, when the needle closing of the first injection was not finished completely before the second started to open the needle again.

Results

ECE (n=1500 rpm/imep=3.2 bar)

The ECE is a low load point at low engine speed where multiple injection strategies are supposed to be beneficial for pollutant emissions and combustion noise. Here, injection patters with 2 to 4 injections were investigated varying the quantity and separation between consecutive injections. The pilot quantities were set to 0.7, 1.0, and 2.0 mg/cycle. The quantity of the main injection was adapted in order to obtain the desired IMEP. The HR50 was held constant at 12° crk.

The following sub sections will discuss the effect of short dwells applied to two and three injections (including main injection) patterns. The detailed analysis on pollutant formation will be given for the two injections setting. Subsequently, the effect of additional injections (three and four injections), of pilot injection quantities, of robustness against EGR will be discussed.

Pollutant Formation as Function of Dwell Times

FIG. 1 shows the smoke, NOx, HC and CO emissions for a variation of dwell times between the first pilot and main injections for a two (black diamonds) and a three-injections-setting (circles). The detailed settings are listed in the Table attached to FIG. 1.

FIG. 2 exhibits the injector current, the rate of heat release (RoHR) and the gas temperature, obtained from a simple perfect gas law approach, as a function of crank angle position for four dwell times, 3.5, 5.0, 8.0 and 30.0° crk (dwell is defined as angular difference between the starts of energizing of the activated injections). The time interval between injector energizing and heat release represents the hydraulic delay plus ignition delay. Hydraulic delay is the time between energizing and effective start of injection, ignition delay is the time between injection and the onset of combustion, i.e. the time available for evaporation and mixing of the fuel. The following sections will explain the pollutant formation, focussing on the short dwell times.

FIGS. 1A-D show smoke, NOx, HC and CO emissions for two (black diamonds), and three (circles) injections. The pilot quantities and dwells are listed in the table. The data depicted on the x-axis, dSOI, is the dwell between P1 and Main injection. Dwell between P2 & M1 was constant. "M1" denotes the main injection and "P" followed by a number denotes the position of the pilot in a sequence of injections. The dwell and fuel mass used for the first (P1) and second (P2) pre-injections are listed in the following table:

|  | dSOI(M1 - P1) | $m_{fuel}$ [mg/stk] | dSOI(M1 - P2) | $m_{fuel}$ [mg/stk] |
|---|---|---|---|---|
| 2 injections | Varied | 1.0 | — | — |
| 3 injections | Varied | 1.0 | 6.0 | 2.0 |

Figure 2B:
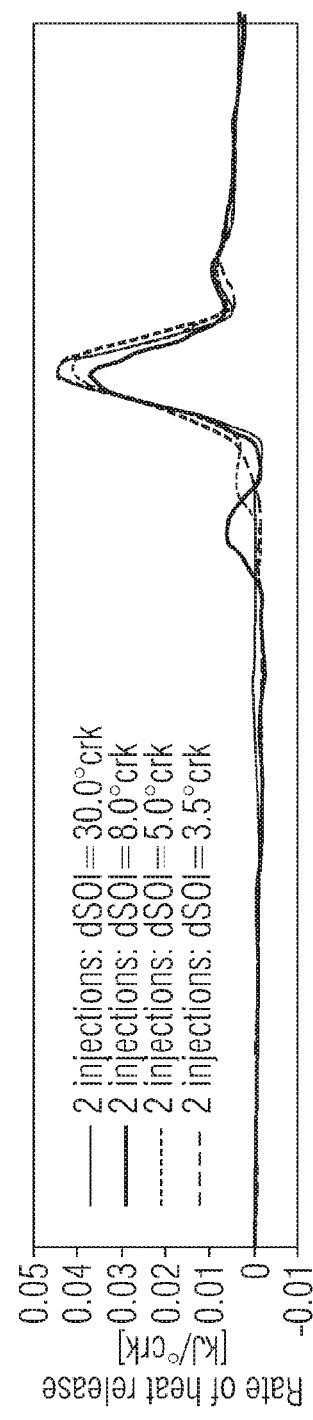
Figure 2C:
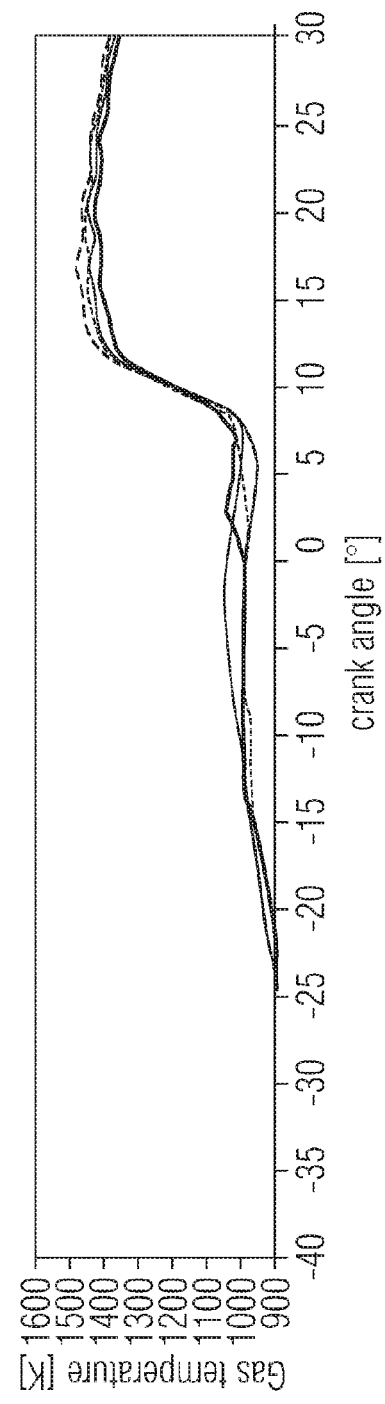
Figure 3A:
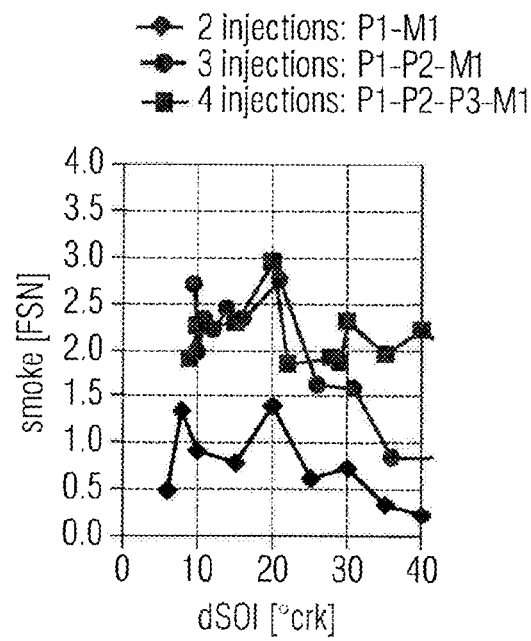
Figure 3B:
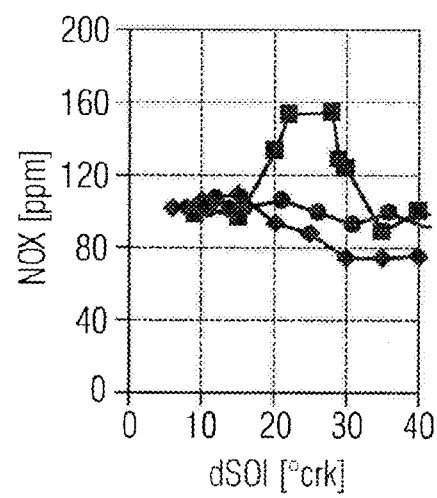
Figure 3C:
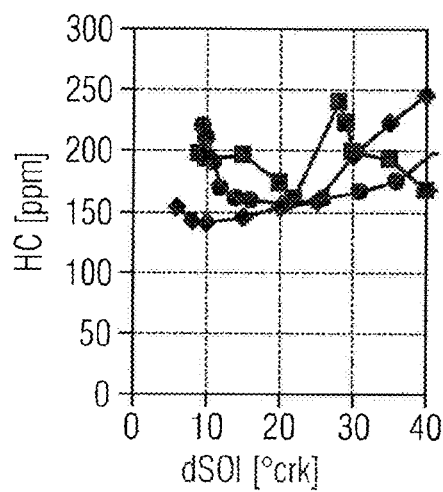
Figure 3D:
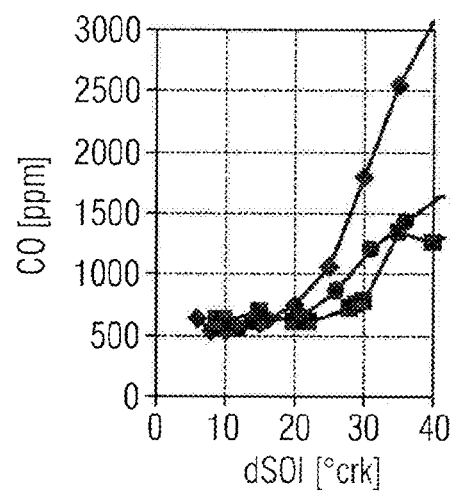
Figure 5A:
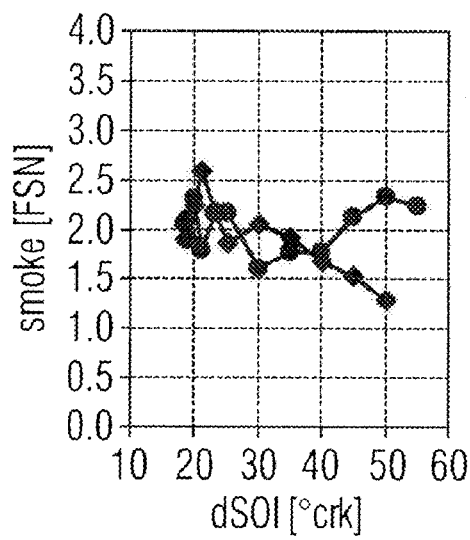
Figure 5B:
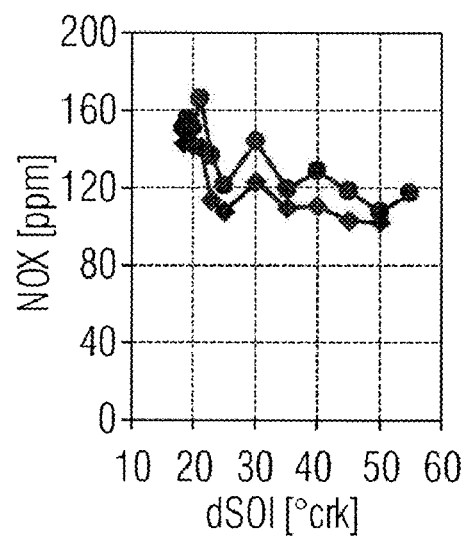
Figure 5C:
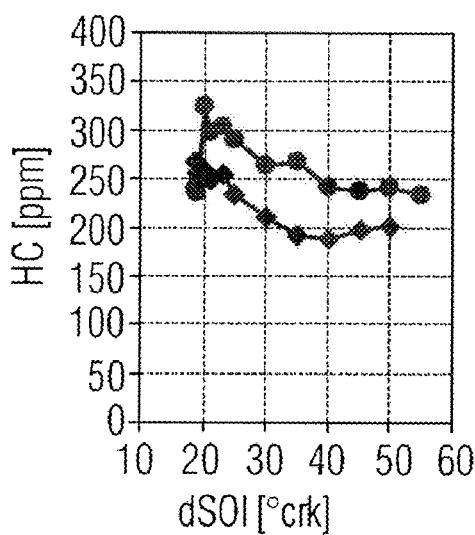
Figure 5D:
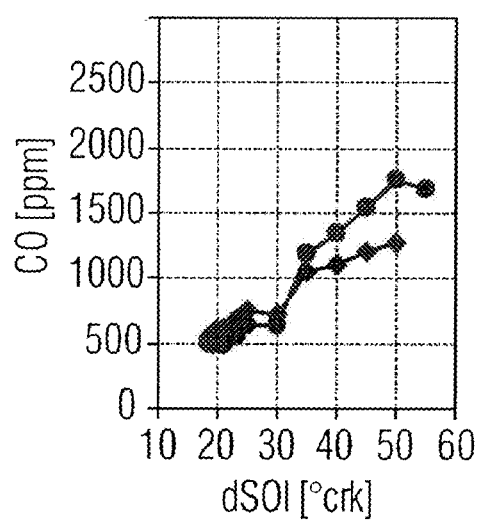

FIGS. 2A-C show injector current, rate of heat release and calculated in-cylinder gas temperature for electric dwells 30.0 (solid, gray line), 8.0 (solid, black line), 5.0 (dotted line) and 3.5° crk (dashed line) for the two-injections-patterns presented in FIG. 1.

Smoke:

Considering the two-injections-setting of FIG. 1, smoke emissions increased from 0.2 to 0.8 FSN, when dwell was increased from "dwell zero", dSOI=3.5° crk, to appr. 20° crk. At dSOI=20° crk smoke passed a maximum and decreased again for dSOI=40° crk to 0.2 FSN.

It is know from Siebers (and D., Higgins B., Flame lift-off on direct-injection diesel sprays under quiescent conditions, SAE 2001 World Congress, Detroit, Mich., 2001 (SAE 2001-01-0530)), that as gas temperature increased for constant gas density, the total amount of air entrained upstream of the lift-off length of the diffusion flame decreased. Gas density was found not to have a significant effect on air entrainment. The lift-off length is defined as the axial distance between the nozzle hole exit and the first appearance of diffusion flame in direction of spray penetration. Ito et al. (2003) measured the flame lift-off length and soot concentration with the two color method, where soot particle radiation is correlated to its concentration. They found similar to Siebers and Higgins (2001) that the lift-off length and hence the entrained air in the fuel spray decreased with increasing gas temperature. They also found that soot production correlated with air entrained into the spray and therefore with gas temperature. Applying the mentioned conclusions to the present data, the determining parameter for smoke emissions appears to be the gas temperature just before the onset of diffusion combustion.

In the present work correlations for the gas temperature, immediately before the start of combustion (SOC) of the main injection, at 6° crk ATDC in FIG. 2C, correlated qualitatively well with the smoke emissions. At low gas temperatures (dSOI=3.5° crk) smoke production was lowest and for high gas temperatures (dSOI=8° crk) smoke emission was highest, which agrees well with the results of Siebers and Higgins (2001) and Ito et al. (2003). Starting at dSOI=3.5° crk, a further increase of dwell led to an increase of the gas temperature before main injection and therefore to higher smoke emissions. For dwells larger than app. 20° crk, the smoke production decreased again, since the early pilot injection burnt much earlier in advance of the main injection, FIG. 2B. Two mechanisms might be responsible for the smoke reduction: Firstly, the combustion of the pilot quantity generated less heat at large dwells, since gas temperature and pressure were still low in the early stages of the compression stroke. Consequently, the temperature increase resulting from an early pilot injection was weaker than for retarded pilot injections. Secondly, heat losses via the cylinder walls caused a decrease in charge temperature before the onset of the main combustion. Both effects lead to a longer ignition delay of the main fuel quantity and, hence, less smoke is produced. For intermediate dwells, the ignition delay of the main fuel quantity was short, due to sufficiently high charge temperature, and combustion mainly took place in diffusion mode, generating larger quantities of smoke.

For the three-injection-pattern, FIG. 1 (circles), the general trend of smoke emission with the variation of dwell was similar to the two-injections-pattern, but on a higher level. Smoke emission reduced strongly, when the dwell was decreased towards dSOI=3.5° crk between both pilot injections.

NOx:

The NOx emission of the two-injection-setting was high for small dwells. They decreased rapidly with increasing dwell times until dSOI=8° crk, FIG. 1. For larger dwells NOx emission then remained constant.

FIG. 2C shows that the maximum gas temperature was highest for short dwells, since the pilot quantity burnt together with the main injection. No time was left for complete mixture formation and combustion of the pilot quantity. The heat released by the main injection added directly onto the heat released from the pilot. Consequently, a certain fraction of the pilot fuel mass burnt at the same time as the first fraction of the main quantity, causing a strong increase in RoHR and a slightly longer duration of it. Both resulted in a higher maximum gas temperature. According to the present data the NOx formation correlates with the maximum gas temperature. Variation of dwell time had no significant effect on maximum gas temperature remained approximately constant (see FIG. 2), with NOx emissions consequently remaining constant, too.

The NOx emissions of the three-injections-pattern remained constant for variable dwell, since the maximum gas temperature was similar for all dwells (not shown in the present data).

HC and CO

Both, HC and CO emissions had a minimum for dwells of app. dSOI=10° crk and 12° crk for the two and the three-injections-pattern, respectively. Decreasing or increasing the dwell, the emissions of both pollutants increased, again for both shown injection patterns.

The strong increase in HC emission towards short dwell times may result from locally leaning out the mixture during ignition delay of the pilot injection. This mechanism is explained as follows: if equal hydraulic delay for the settings shown in FIG. 2 is assumed, the ignition delay of the pilot injection increased from 7.0 to 8.4° crk for decreasing dwells 8 to 3.5° crk, respectively. The fuel close to the spray boundary, defined as $\lambda \approx 3$, has already mixed beyond the lean limit of combustion and will not auto ignite or sustain a fast reaction front.

The CO emissions increased strongly, similar to the HC emissions, when the dwell was decreased from 10° crk to 3.5° crk. It is most likely, that the CO oxidation of the pilot injection was quenched, since the main injection followed immediately after the pilot injection. In such cases the heat of evaporation of the main injection cools down the adjacent charge, causing the quenching of the CO oxidation of the pilot quantity.

Another, less likely mechanism may be fuel rich combustion at high temperature taking place in the spray plume of the main injection. Then however, smoke emission also would have increased, which was not the case, FIG. 1.

At large dwells, high HC and CO emissions probably resulted from fuel impinging onto the cylinder liner and subsequent late evaporation of and flame quenching close to the walls. Fuel impingement occurred, because the pilot quantity was injected at low gas temperature and low gas density and, hence, the liquid fuel core of the pilot injection penetrated much further than at later crank angle positions with higher gas densities.

Effect of the Number of Injections

"Multiple injections" means the injection of small fuel quantities at defined crank angle positions in order to influence the mixture formation of fuel and air, the combustion process and finally the pollutant formation. This section deals with the effect of splitting the pilot fuel quantity into one, two or three injections and the variation of the dwells between these. FIG. 3 displays the pollutant emissions for two, three and four injections (including the main injection), where the sum of the pilot quantities equals approximately 2 mg/cycle. For details please see the table attached to FIG. 3.

The general trend of smoke emissions was similar for all three patterns. For small dwells the smoke emission was highest and then decreased with increasing dwell. For the pattern with two injections, the smoke emission decreased for very small dwells (dSOI=3.5° crk), which is in agreement with FIG. 1, where pilot quantity was 1.0 mg/cycle. The NOx emissions were similar for all three measurement series for dwells between 3.5° crk and 15° crk. For larger dwells NOx emissions increased from two to four injections. It is worth noting, that the sensitivity of CO emissions to variations of dwell decreased with increasing number of injections. For increasing dwell, the increase in CO became smaller with higher number of injections.

FIGS. 3A-D show (A) Smoke, (B) NOx, (C) HC and (D) CO emissions for two (black diamonds), three (circles), and four (squares) injection patterns. The pilot quantities and dwells are listed in the table. Shown on the x-axis is dwell, dSOI, between P1 and Main injections. Dwells between P2 & M1, P3 & M1 were constant. "M1" denotes the main injection and "P" followed by a number denotes the number of a pilot injection. The dwell and fuel mass used for the first (P1), second (P2) and third pre-injections are listed in the following table:

retarded with respect to the combustion of the two pilots of the four-injections-pattern, causing a slightly lower gas temperature before the main injection. The pilot injection of the two-injections-pattern only mixed with the gas but did not burn in advance of the main injection. Therefore, gas temperature was lowest before the onset of the main combustion. Therefore, smoke emission was smallest for the two injections and highest for the four-injections-pattern. NOx emissions did not correlate with the maximum gas temperature. The maximum gas temperature of the two injections was highest but NOx emissions were lowest. Besides the maximum gas temperature, the combustion duration at elevated gas temperature is supposed to be significant for NOx formation: The NO formation almost always takes place in the hot post flame gases, since here the burnt gases produced early in the cycle are compressed and therefore local temperatures increase. Linking combustion duration to the existence of hot post flame gases, an assumption for the level of NOx emissions can be drawn: for the three and the four-injections-patterns the entire combustion duration, and therefore the duration of the hot post flame gases, was much longer than for the two-injections-pattern. Consequently, higher NOx emissions were produced.

The NOx emissions of the four-injections-settings passed a strong maximum, when dwell was decreased from 30° crk to 20° crk. Here, the first pilot injection merges with the second pilot, positioned at 25° crk before the main injection. The two pilot injections positioned close together at early crank angles behaved as a single pilot injection with the accumulated fuel quantity of both. Therefore they burnt immediately, which resulted in high gas temperatures causing high NOx emissions.

The HC and CO sensitivity on dwell, shown in FIG. 3, decreased with increasing numbers of injections. The larger the number of injections, the higher the gas temperature averaged over the combustion period FIG. 4B. As discussed in a previous Section, quenching was the reason for high HC and CO for early pilot injections. For larger numbers of injections the cylinder charge was heated up earlier, so that the thermodynamic conditions for good oxidation of HC and CO were

|  | P1 | | P2 | | P3 | |
|---|---|---|---|---|---|---|
|  | dSOI (M1 - P1) | $m_{fuel}$ [mg/stk] | dSOI (M1 - P2) | $m_{fuel}$ [mg/stk] | dSOI (M1 - P3) | $m_{fuel}$ [mg/stk] |
| 2 injections | Varied | 2.0 | — | — | — | — |
| 3 injections | Varied | 1.0 | 6.0 | 1.0 | — | — |
| 4 injections | Varied | 0.7 | 25.0 | 0.7 | 6.0 | 0.7 |

The correlation between the soot production, air entrainment and gas temperature was discussed in one of the preceding sections and is demonstrated in FIG. 4.

FIGS. 4A-B show that the higher the gas temperature immediately before the main heat release (for the present case at app. 8° crk ATDC) was, the less intensive was the air entrainment into the spray plume of the main injection. Consequently, combustion started at lower local air-fuel ratios, generating more smoke.

The two small and early pilot injections of the four-injections-pattern burnt simultaneously and at early crank angles (appr. between −12 and −8° crk ATDC), leading to an increase in gas temperature. Additionally the third pilot injection burnt in advance of the main injection, where gas temperature increased again. This effect caused higher smoke emissions. The first injection of the three-injections-pattern burnt reached for a longer period. Consequently, quenching and therefore HC and CO emissions were reduced.

FIGS. 4A-B show (A) rate of heat release and (B) gas temperature for dwell dSOI=30° crk (same data as in FIG. 3): Solid, black line=two-injections-pattern; Dotted line=three-injections-pattern; Dashed, line=four-injections-pattern. The detailed settings are listed in the table attached to FIG. 3. NOTE: IMEP was equal for all three settings!

Effect of Pilot Injection Quantity

Besides the distribution of a fixed fuel quantity on different numbers of pilot injections and the variation of dwells, the quantity of pilot injection has a significant effect on mixture formation, combustion and pollutant formation. This Section deals with the influence of the quantity variation on pollutants. Two patterns with three injections each were selected, one pattern with small pilot quantities (0.7 and 1.0 mg/cycle for P1 and P2) and one pattern with large pilot quantities (1.0 and 2.0 mg/cycle for P1 and P2). FIGS. 5A-D exhibits the smoke, NOx, HC and CO emissions as a function of the dwell. The dwell between P2 and M1 was held constant at 15° crk.

Smoke and CO emissions were not affected significantly by the pilot injection quantity for dwells between 18.5 and 40° crk. This is shown in FIG. 5. For larger dwells the increase of both emissions was stronger for the setting with large pilot injection quantities. NOx and HC emissions were constantly higher for large pilot quantities (circles) than for the small pilot quantities. NOx were higher, due to the increased gas temperatures. Elevated gas temperatures resulted from larger pilot fuel quantities.

FIGS. 5A-D show (A) Smoke, (B) NOx, (C) HC and (D) CO emissions for small (black diamonds), and large (blue circles) pilot injection quantities. The pilot quantities and dwells are listed in the table. Dwells between P2 & M1 was constant. Shown on the x-axis is dwell, dSOI. "M1" denotes the main injection and "P" followed by a number denotes the position of the pilot in a sequence of injections. The dwell and fuel mass used for the first (P1) and second (P2) pre-injections are listed in the following table:

|  | P1 | | P2 | |
| --- | --- | --- | --- | --- |
|  | dSOI (M1 - P1) | $m_{fuel}$ [mg/stk] | dSOI (M1 - P2) | $m_{fuel}$ [mg/stk] |
| 3 injections | Varied | 0.7 | 15.0 | 1.0 |
| 3 injections | Varied | 1.0 | 15.0 | 2.0 |

In FIG. 6 the RoHR and the gas temperature are plotted against the crank angle. It is shown, that the gas temperature of the setting with large pilot quantities increased earlier than that with smaller pilot quantities. However, the maximum gas temperature due to the main combustion was equal for both settings. Following the discussion of the preceding Section, the NOx formation depends highly on the maximum gas temperature but as well on the residence time at elevated gas temperatures. For equal maximum gas temperatures (as in the present case), the residence time becomes more significant for the NOx formation. For the present cases, the combustion duration at elevated gas temperatures was much longer for the large-pilot-injections setting than for the small-pilot-injections setting and, hence, NOx formation increased.

The assumption of "leaning out" (see above) during mixture formation offers an explanation for the increased HC emissions for the large-pilot-injections setting. When the pilot injection was advanced, the ignition delay increased, since at early crank angles the charge temperature is lower than close to TDC. Hence, spray penetration increased and regions with lean air-fuel ratios were formed. For this case inflammability of the mixture is unlikely and HC remain unburned.

FIGS. 6A and B show (A) rate of heat release and (B) gas temperature for dwells of dSOI=30° crk for P1 and 15° crk for P2 (same data as FIG. 5):
Solid black line: $m_{fuel,\ P1}$=0.7 mg/cycle, and $m_{fuel,\ P2}$=1.0 mg/cycle; Dotted blue line: $m_{fuel,\ P1}$=1.0 mg/cycle, and $M_{fuel,\ P2}$=2.0 mg/cycle. The detailed settings are listed in the table attached to FIG. 5.

Influence of EGR Rate

Generally, EGR is applied to diesel engines in order to decrease oxygen concentration in the charge and subsequently retard combustion. This reduces the gas temperature and consequently lowers NOx emissions. An EGR variation was conducted with two, three and four injections, in order to evaluate the mentioned effects on different injection strategies. FIG. 7 shows trade-off diagrams of smoke, HC and CO emissions, the ISFC and the combustion noise—expressed in pressure gradient per degree crank dp/d☐. over NOx emissions. EGR was varied from 0 to app. 40%. With respect to FIG. 7, low NOx indicate high EGR rates and vice versa. Best results for the smoke and ISFC over NOx were achieved with only two injections. Smoke doubled approximately for each additional injection. CO emissions behaved similarly to the smoke emissions, best for two injections and worst for four injections. The combustion noise reduced significantly from two to four injections. Noise was lowest for four injections and high EGR rates (low NOx emissions).

FIGS. 7A-E show (A) Smoke, (B) HC and (C) CO emissions, (D) ISFC and (E) dp/dϕ as a function of NOx emissions for variation of EGR rate: Two Injections (black diamonds), three Injections (blue circles) and four Injections (red squares). The pilot quantities and dwells are listed in the table. Dwells between P2 & M1 and P3 & M1 were constant. "M1" denotes the main injection and "P" followed by a number denotes the position of the pilot in a sequence of injections. The dwell and fuel mass used for the first (P1) and second (P2) pre-injections are listed in the following table:

|  | P1 | | P2 | | P3 | |
| --- | --- | --- | --- | --- | --- | --- |
|  | dSOI (M1 - P1) | $m_{fuel}$ [mg/stk] | dSOI (M1 - P2) | $m_{fuel}$ [mg/stk] | dSOI (M1 - P3) | $m_{fuel}$ [mg/stk] |
| 2 injections | 6.0 | 2.0 | — | — | — | — |
| 3 injections | 25.0 | 0.7 | 6.0 | 1.0 | — | — |
| 4 injections | 35.0 | 0.7 | 25.0 | 0.7 | 6.0 | 1.0 |

Taking into account all parameters presented in FIG. 7, the three-injections-strategy appears to be the best compromise, since smoke and HC emissions and ISFC were similar to the two-injections-pattern, but combustion noise was much lower. The four-injections-strategy, with a similar combustion noise than the three injections pattern, showed disadvantages in smoke, CO and ISFC. The benefit in combustion noise resulted from the early pilot injections. In this case the cylinder pressure rose already significantly, when the pilot injections burnt. Consequently, the pressure increase and peak RoHR of the main injection were lower, resulting in lower combustion noise, (see also FIG. 4).

Summary: ECE Operating Point (n=1500 rpm/imep=3.2 bar)

Applying short hydraulic dwells (between 6 and 3.5° crk) to two- and three-injections-patterns, the CO emissions were reduced significantly compared to large dwell settings at equal smoke emissions. The NOx emissions increased for the two and remained constant for the three-injections-patterns, decreasing the dwell from large towards zero.

The smoke emissions at short dwells were at a low level and similar to the emissions at very large dwells. At intermediate dwells the smoke emissions passed a maximum, since here the combustion of the pilot injection caused the highest increase of gas temperature. Consequently, the ignition delay was short, mixture formation was on a low level and, hence, larger amounts of smoke were generated from diffusion combustion.

The HC emissions increased for decreasing dwell towards zero. This was because the heat of evaporation of the close main injection cooled down the charge. This resulted in an increased ignition delay and some leaning-out of the mixture, generating HC due to quenching. The leaning out was a result of increased penetration during ignition delay.

Considering the three injections pattern, the strong sensitivity of smoke, HC and CO emissions to the variation of dwell showed that these settings are not recommendable for application on a multi cylinder engine. This is, because cylinder-to-cylinder tolerances would cause unstable, potentially high emissions. Large dwell settings had no disadvantages compared to short dwells with regard to emissions, but showed a much better robustness against deviations in separation angle.

Increasing the number of injections from two to four, the smoke emissions increased independently of the dwell.

Early pilot injections (40 and 50° crk advance from main injection) reduced smoke and NOx emissions, since the pilot quantity homogenised well. Small pilot quantities had to be applied in order to ensure, that the early combustion of the pilot injections did not increase the gas temperature to much, which would have produced higher smoke and NOx emissions. Therefore, pilot injections had to be small (0.7 mg/cycle or less) when multiple injection strategies were applied.

ACP (n=2280 rpm/imep=9.9 bar)

The ACP is a load point representing the acceleration phase during the extra urban part (EUDC) of the NEDC (new European driving cycle) for passenger cars, where a huge part of the overall NOx emission is produced. Hence, an optimisation with respect to emissions is of major interest.

It has been shown, that a ramp shaped main injection offers some advantages in smoke and NOx. With Common Rail systems a ramp shaped injection rate may possibly be produced by running a sequence of small pilot injections, placed directly after each others ("short dwell"). This however includes the risk, that atomisation might deteriorate, due to the multiple opening sequences of the nozzle needle.

The investigation of the injection strategies "large dwell" and "short dwell" was performed with different EGR rates and at a constant position of HR50 at 12° crk ATDC. At zero EGR the effects of the variation of injection strategy (number of injections and dwells) might be most explicit, since diesel combustion is not "diluted". After variation of the number of injections and dwell, a block shift was applied to the best settings of a two, a three and a four-injections-pattern. The entire procedure was repeated for an EGR=20%, since the conclusions drawn from EGR=0% must not necessarily coincide with the conclusions for EGR=20%. A post injection was not used. (A post injection is desirable for most strategies, since the extended period of moderately high gas temperatures in the combustion chamber prolongs the oxidation of soot).

At EGR=0%, first, a large dwell setting was defined as baseline: Patterns of two and three injections were investigated with varying quantity and dwells (large dwells) of each injection. The number of injections had no great effect on NOx emissions. Finally, the strategy comprising three injections (with large dwell) was used as base line for the subsequent investigation of short dwell strategies with two to five injections.

Table 3 shows the sequence of the short dwell investigations, which was carried out at two constant EGR rates, 0% and 20%. The injection quantity of each injection and the dwell to its neighbours were varied.

Table 3 shows an overview of short dwell investigations. The quantity X was adapted to match the desired engine load. P=pilot injection, M=main Injection. "Block shift": fuel quantities and dwell of all injections were held constant and the timing with respect to TDC of the whole configuration was shifted together.

TABLE 3

|  | 2 injections P1 - M1 | 3 injection P1 - P2 - M1 | 4 injections P1 - P2 - P3 - M1 | 5 injections P1 - P2 - P3 - P4 - M1 |
|---|---|---|---|---|
| $m_{fuel}$ [mg/cycle] | 1 - X | 1 - 2 - X | 1 - 2 - 4 - X | 1 - 2 - 4 - 6 - X |
| Variation of injection quantity | P1 | P1 | P1 | P1 |
| Variation of dwell | P1 - M1 | P1 - P2 | P1 - P2 | P1 - P2 |
| Block shift | All | All | All | All |

Block Shift at EGR=0% with Short Dwell

The best settings for the variations of injection quantity (of P1) and dwell, as explained in table 3, were used for a block shift (explanation of "block shift" see Table 3). FIG. 8 exhibits the smoke and NOx emissions as well as the combustion noise over HR50.

Smoke emission increased with increasing numbers of injections. NOx emissions remained constant for settings with two and three injections and increased slightly for four and five injections. Combustion noise was lowest for the two-injections-pattern and increased to slightly elevated, but similar levels for all other patterns.

Figure 8A:
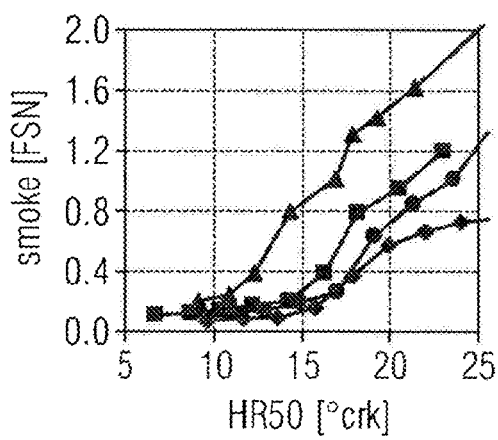
Figure 8B:
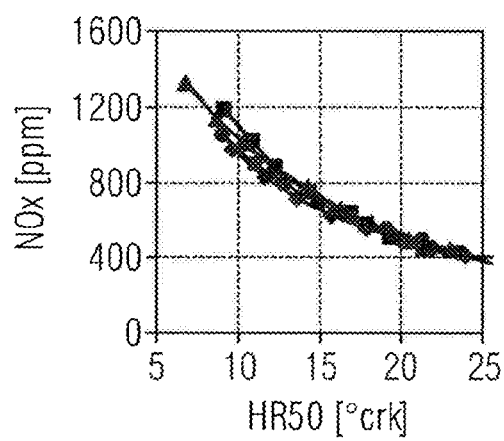
Figure 8C:
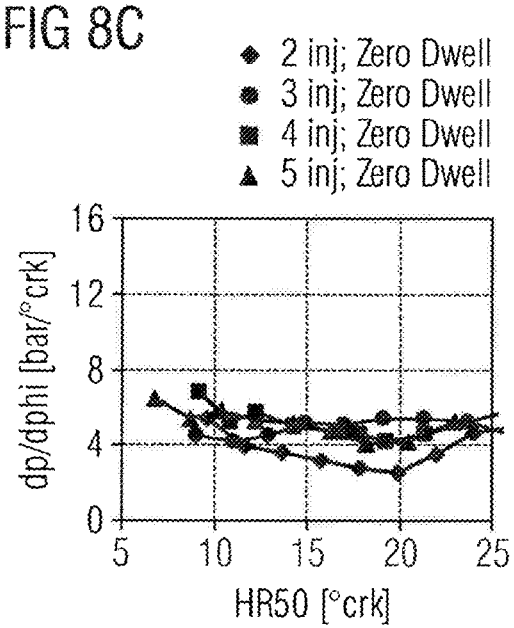
Figure 9A:
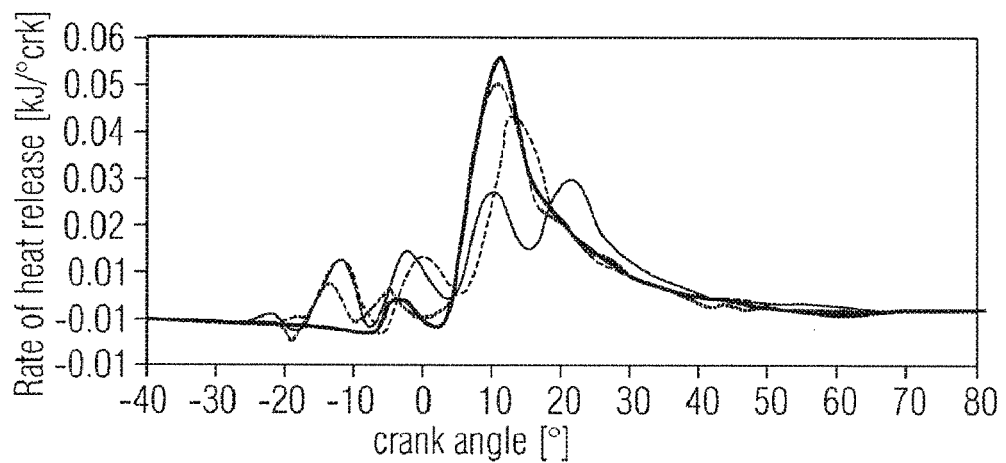
Figure 9B:
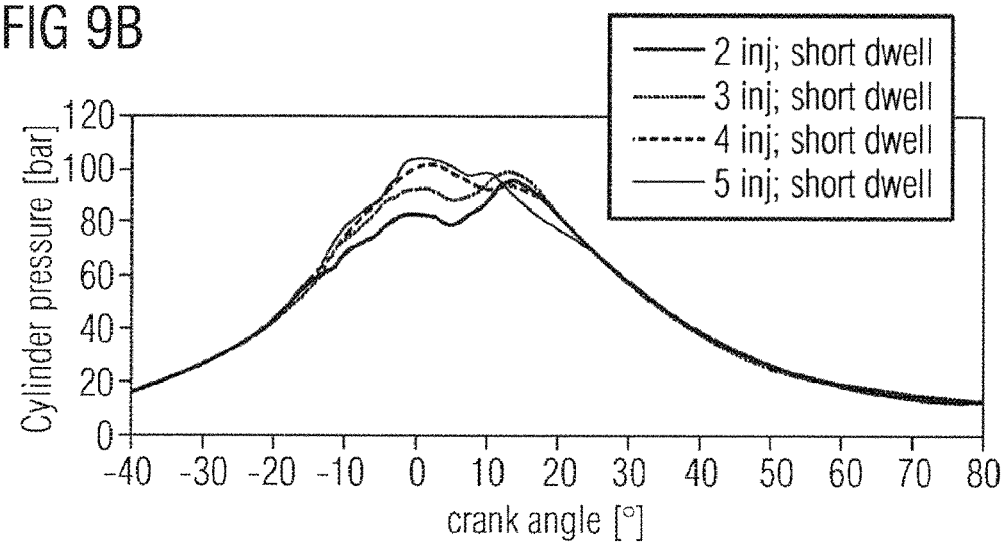
Figure 9C:
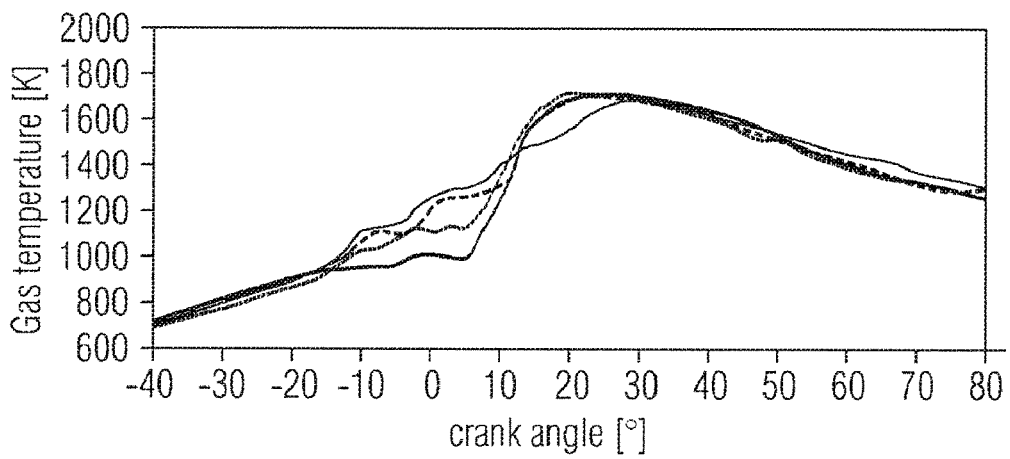
Figure 9D:
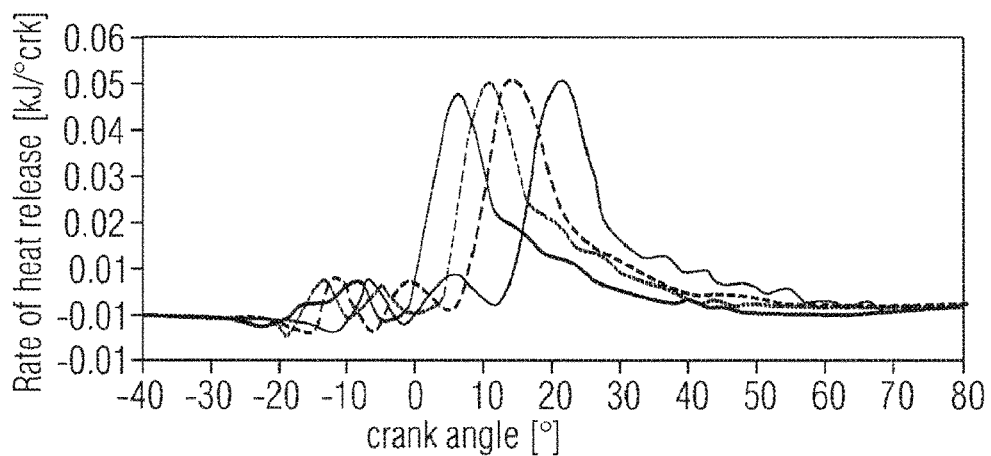
Figure 9E:
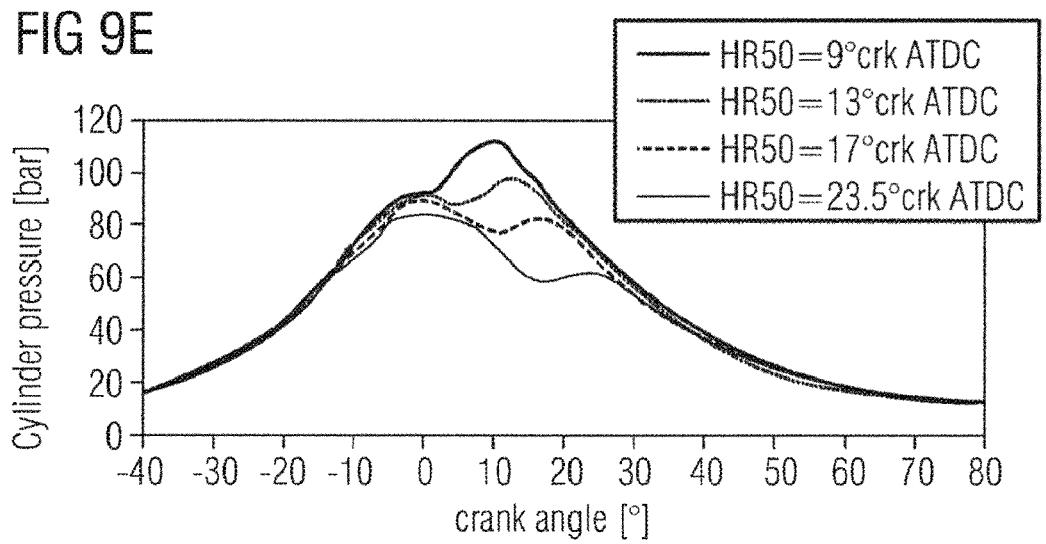
Figure 9F:
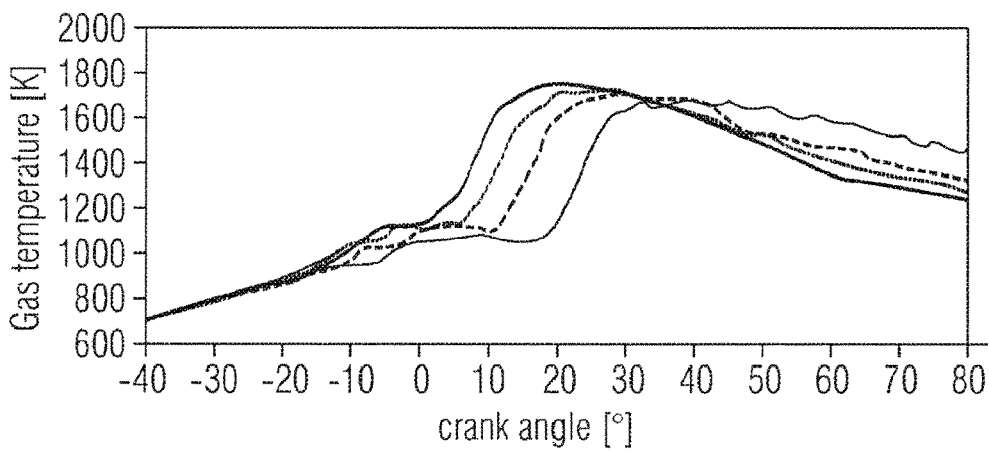

FIGS. 8A-C show (A) Smoke, (B) NOx emissions and (C) combustion noise for a block shift of short dwell settings with two to five injections.

The heat release rate and the average gas temperature are shown in FIG. 9 for constant NOx=750 ppm and for settings with two to five injections.

The increase in smoke emissions with the number of injections may be explained again with the mechanism already discussed previously for the low load operating point (ECE): the higher the number, of injections, the higher the fuel quantity injected before the main heat release. Hence, a significant portion of the entire fuel quantity was already burnt before the main heat release, i.e. between app. −20 and 5° crk. This lead to higher gas temperatures at 5° crk and reduced the air entrainment into the spray plume until ignition of the succeeding main fuel quantity. Therefore, combustion took place in a locally fuel rich environment, increasing smoke emissions. Since the maximum gas temperature was similar for all settings the NOx formation was similar as well.

FIGS. 9A-F show a rate of heat release, in-cylinder pressure and gas temperature for FIGS. 8A-C NOx=750 ppm and settings with two to five injections; FIG. 8 D-F for a three-injections-settings (short dwell) block shifted.

Beside the increase of smoke emissions with increasing number of injections, the smoke emissions increased as well when the injection patterns were retarded, applying the already mentioned block shift. This increase in smoke was stronger, when the number of injections was higher. Here, the combustion duration appears to affect the smoke emission: retarding the entire injection pattern (block shift), the combustion was shifted towards lower cylinder pressures and in-cylinder gas temperatures in the expansion stroke, FIGS. 9(e) and (f). This effects a deterioration of atomisation as well as evaporation. As a consequence, combustion efficiency decreased and smoke emission increased. Particularly affected were injection strategies with high numbers of injections, which inherently prolongs combustion duration.

Block Shift at EGR=0%, Comparison of Short and Large Dwell

This Section compares the quasi ramp shaped short dwell injection pattern with the more widely used large dwell and a common single injection.

FIG. 10 shows a comparison of the best "short dwell" setting, which was that with two injections, the best "large dwell" setting, and a single injection. No significant differences were apparent, when the position of 50% heat release (HR50) was between 5 and 15° crk ATDC. Retarding HR50, the single injection produced less smoke and both multiple injection settings showed increasing smoke emission. The combustion noise was similar for both multiple injection settings and much higher for the single injection case.

Figure 10A:
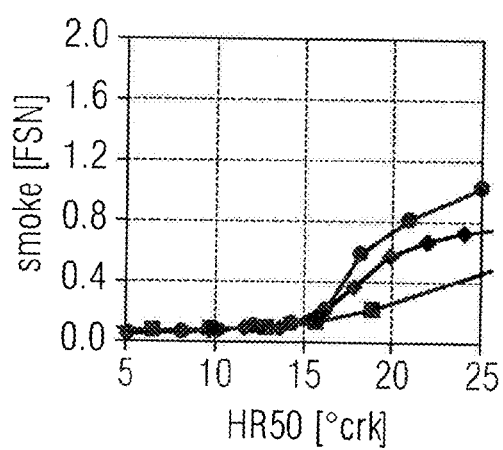
Figure 10B:
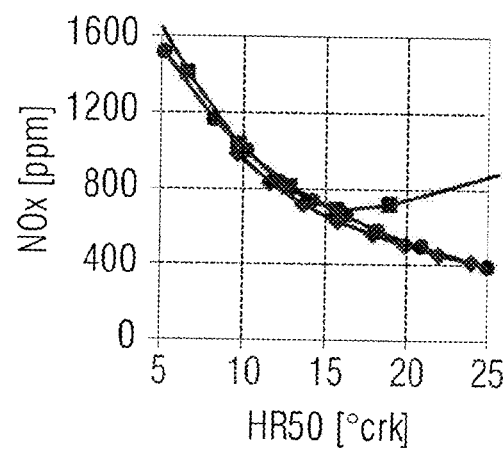
Figure 10C:
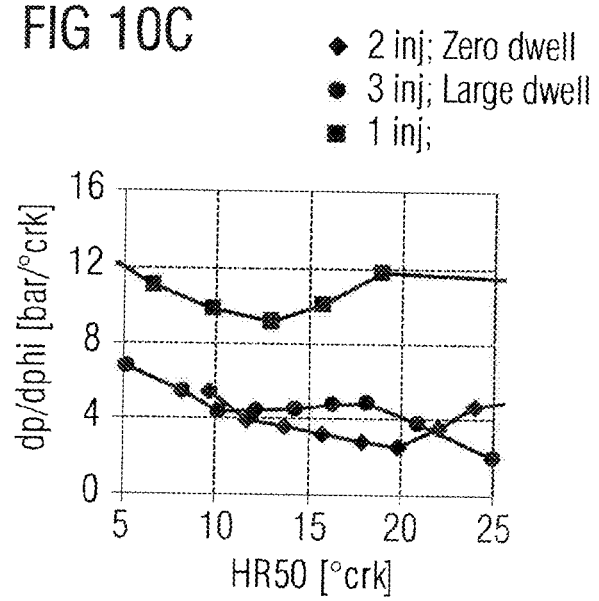
Figure 11A:
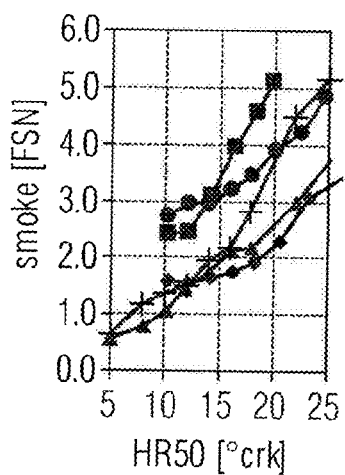
Figure 11B:
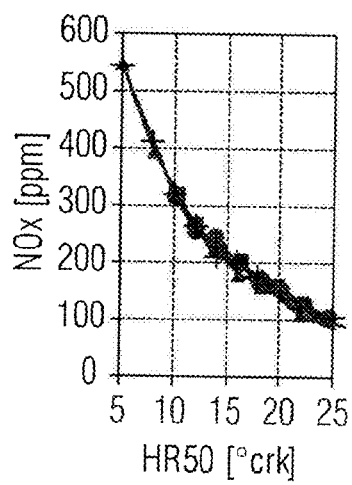
Figure 11C:
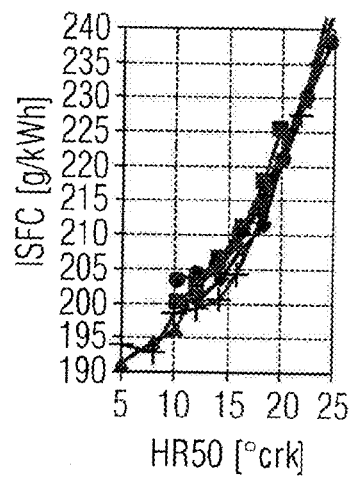
Figure 11D:
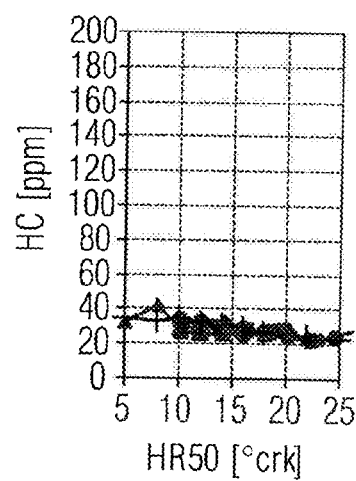
Figure 11E:
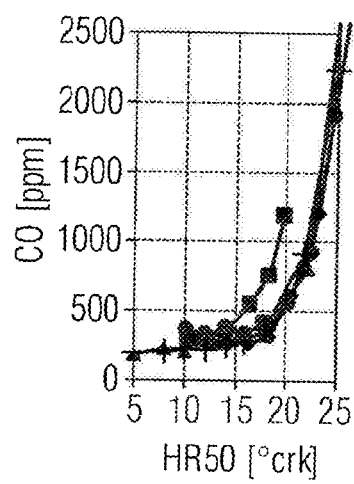

FIGS. 10A-C show (A) Smoke, (B) NOx emissions and (C) combustion noise for a block shift of short dwell setting with two injections, large dwell setting with three injections and one single injection.

For combustion process without EGR the single injection offers the lowest smoke but unacceptable noise emissions. This is due to an enhanced mixture formation of the main fuel quantity before ignition. Consequently, a larger portion of fuel ignited, which produced a stronger increase in pressure. Both, two and three injection patterns show decreasing NOx and acceptable noise emissions but with the drawback of elevated smoke. If EGR cannot be applied, the two-injections-pattern with short dwell offers a good compromise, since NOx emissions are on a similar or lower level than the other injection sequences, noise is low and smoke is elevated but acceptable compared to the three-injections-setting (with large dwell).

Effect of Block Shift at EGR=20%, Comparison of Short and Large Dwell

The investigations carried out for no EGR were repeated at EGR=20%. Firstly, the number of injections and dwell was varied, the results of which are not shown in the present publication. Again, as for the case without EGR, a block shift was performed with the best settings for a two and a three-injections-pattern.

Increasing the EGR rate to 20% the observations made for 0% of EGR remain essentially the same (see FIG. 11): Increasing the number of injections with short dwell caused higher smoke emissions. NOx emissions were not affected. Fuel consumption increased slightly with increasing number of injections. With increasing numbers of injections, start of combustion was advanced and duration of the combustion increased. Still the combustion duration was extended into the expansion stroke, causing lower combustion efficiency and therefore higher fuel consumption. The HC and the CO emissions remained more or less constant for all of the presented data.

The positive effect of short dwell, when three to four injections were applied at the ECE point, could not be observed at the medium load point, ACP. The overall gas temperature level of the ACP was much higher than for the ECE (compare FIG. 2 and FIG. 9). Incomplete combustion due to low in-cylinder temperatures and incomplete evaporation, leading to high HC and CO emissions, was unlikely to occur. Large dwell settings with two and three injections produced similar pollutant emissions than the short dwell setting with two injections.

FIGS. 11A-E show (A) Smoke, (B) NOx emissions, (C) fuel consumption, (D) HC and (E) CO emissions over the position of 50% heat release, HR50, for a block shift of short dwell settings with two to four injections and large dwell setting with two and three injections It becomes clear, that the emission most affected by the number of injections was smoke, particularly at short dwell. FIG. 12 shows a correlation between smoke emission 1 and the combustion period above 1400K for short dwell settings at 20% EGR. Short combustion duration and subsequently a short residence time of the reactants at in-cylinder gas temperatures above some 1400 K appears to be crucial for low smoke emissions. This is because at low local air-fuel ratios, □<0.8, smoke production starts at gas temperatures above approximately 1400K (Pischinger et al. (2004)). According to these authors soot formation is the dominating process at these temperatures. The soot oxidation takes place at much leaner air-fuel ratios and higher gas temperature. Hence, soot oxidation appears not to be the determining process in the presented case.

FIG. 12 shows the correlation of smoke emission (FSN) and combustion period [$\Delta t_{1400}$ in ° crk] above 1400K in-cylinder gas temperature. $R^2$ is the correlation coefficient.

Summary for ACP (n=2280 rpm/imep=9.9 bar)

AT ACP a "ramp shaped" injection was produced by running a sequence of small pilot injections, placed directly after each others ("short dwell"). It has been shown, that a ramp shaped main injection offers some advantages in smoke at equal NOx emissions (Gärtner, 2004). The thermodynamic and chemical processes during diesel combustion differ significantly depending on EGR. Therefore, the investigations were carried out at two constant EGR rates, 0 and 20%.

At 0% EGR it was observed, that at short dwells the NOx emissions and combustion noise were unaffected by the applied numbers of injections. Smoke emissions increased from two to five injections. Here, the mechanism already discussed in detail at ECE might be applied: increasing the number of injections, the in-cylinder gas temperature increased before the onset of combustion of the main fuel quantity. Therefore, less air entrained into the spray plume until ignition. A local fuel-rich combustion took place and smoke was generated. The comparison of short dwell with large dwell settings yielded that at 0% EGR the short dwell setting had little advantages in smoke at equal but high NOx emissions (app. 600 ppm) and equal level of combustion noise as the large dwell setting.

Since an important assumption were low NOx emissions, the outcome at high EGR rates (lower NOx level as without EGR) is more relevant. At 20% EGR the NOx emissions were app. 200 ppm. Here, the advantage of the short dwell setting could not be obtained. In contrast, the large dwell settings with two injections produced less smoke and required less fuel at equal NOx, HC and CO emissions.

At EGR=20% the smoke emissions correlated with the residence time of combustion at gas temperatures above 1400K. Smoke production taking place at low air-fuel ratios and gas temperatures above 1400K might be the process determining smoke emissions. Smoke oxidation, taking place under lean air-fuel conditions and higher temperature may not be significant for the present data.

CONCLUSIONS

"Multiple injection strategies" with up to 5 injections, focussing on short dwells settings were investigated at two operating points, n=1500 rpm/imep=3.2 bar, and n=2280 rpm/imep=9.9 bar. A single cylinder engine equipped with a piezo-driven injection system was used. The multiple injection strategy with short dwells may reproduce a ramp shaped injection, which is supposed to be beneficial for smoke emissions.

ECE (n=1500 rpm/imep=3.2 bar):
- Short dwell injection settings produced less HC and CO emissions compared to large dwell settings at similar smoke. At intermediate dwells the smoke emissions passed a maximum, since here the combustion of the pilot injection caused the highest increase of gas temperature. Consequently, the ignition delay was short, mixture formation was on a low level and, hence, larger amounts of smoke were generated from diffusion combustion.
- NOx emissions increased strongly for a two-injections-setting decreasing the dwell towards zero.
- The HC emissions increased for decreasing dwell towards zero. This was because the heat of evaporation of the close main injection cooled down the charge. This resulted in an increased ignition delay and some leaning-out of the mixture, generating HC due to quenching. The leaning out was a result of increased penetration during ignition delay.
- Large dwell settings had no disadvantages compared to short dwells with regard to emissions, but showed a much better robustness against deviations in separation angle.

ACP (n=2280 rpm/imep=9.9 bar)
- At 0% of EGR the short dwell setting with two injections had little advantages in smoke at equal but high NOx emissions (app. 600 ppm) and equal level of combustion noise as the large dwell setting. A single injection produced lowest smoke at similar NOx emissions as the multiple injection strategies. But combustion noise was unacceptably high, disqualifying it for serial engine applications.
- At 20% EGR the large dwell setting with two injections produced slightly less smoke and fuel consumption was below the short dwell settings.
- NOx, HC and CO emissions were not affected by dwell.
- At 20% EGR a correlation was found between the residence time of combustion above 1400K and smoke emissions, including variations in numbers of injections and HR50.

Finally, multiple injection strategies with short dwells is recommendable at least for low loads, where the only significant benefit was the reduction of CO emissions. Due to the high requirements on the injection system and the electric compounds, the overall benefit of short dwells is rather poor. Much more beneficial appears to be a highly sophisticated multiple injection strategy with smallest pilot quantities and relatively large dwells.

| Notations | |
|---|---|
| ATDC | After top dead center |
| CO | CO emission [ppm] |
| dp/dφ | Combustion noise [bar/° crk] |
| dSOI | difference between SOI of two injections [° crk] |
| EGR | Exhaust gas recirculation |
| IMEP | Indicated mean effective pressure [bar] |
| HC | HC emission [ppm] |
| HR50 | Position of the point of 50% heat release ATDC [° crk] |
| ISFC | Indicated specific fuel consumption [g/kWh] |
| M1 | Main injection |
| $m_{fuel}$ | injection mass [mg/stk] |
| $NO_x$ | $NO_x$ emission [ppm] |
| p_boost | Boost pressure [bar] |
| PM | Smoke emission [FSN] |
| Pn | Pilot injection, n denotes number of pilot |
| p_rail | Fuel pressure in rail [bar] |
| RoHR | Rate of Heat Release [kJ/° crk] |
| SOC | Start of combustion [° crk] |
| SOI | Electric start of injection [° crk] |
| TDC | Top dead center |
| $T_{exh}$ | Exhaust gas temperature [° C.] |
| $\Delta t_{1400}$ | Combustion duration with T above 1400 K [° crk] |
| λ | stoichiometric air-fuel ratio |

The invention claimed is:

1. A method for reducing pollutant emissions and consumption of an engine comprising:
    calculating a mean gas temperature from a time dependent pressure signal in a combustion chamber and a corresponding volume of said combustion chamber; and
    minimizing the mean gas temperature of a combustion chamber of said engine before an ignition of the second injection by controlling a dwell time between a first injection and a second injection.

2. The method according to claim 1, wherein the pressure signal is delivered by a pressure sensor arranged in the combustion chamber of said engine.

3. The method according to claim 1, wherein the second injection is a main injection.

4. The method according to claim 1, wherein engine parameters are controlled such that a maximum gas temperature in the combustion chamber or a duration at the maximum gas temperature is optimized.

5. The method according to claim 4, wherein the engine parameters are selected from the group consisting of: EGR-rate, amount of injection per cycle, fuel amount and injection timing.

6. The method according to claim 1, wherein engine parameters are controlled such that a maximum gas temperature in the combustion chamber and a duration at the maximum gas temperature is optimized.

7. The method according to claim 1, wherein minimizing the mean gas temperature of the combustion chamber of said engine before the ignition of the second injection by controlling the dwell time between the first injection and the second injection comprises decreasing the dwell time between the first injection and the second injection.

8. A system for reducing pollutant emissions and consumption of an engine comprising:
    means for calculating a mean gas temperature from a time dependent pressure signal in a combustion chamber and a corresponding volume of said combustion chamber; and
    means for minimizing the mean gas temperature of a combustion chamber of said engine before an ignition of the second injection by controlling a dwell time between a first injection and a second injection.

9. The system according to claim 8, wherein the pressure signal is delivered by a pressure sensor arranged in the combustion chamber of said engine.

10. The system according to claim 8, wherein the second injection is a main injection.

11. The system according to claim 8, wherein the system is operable to control engine parameters such that a maximum gas temperature in the combustion chamber or a duration at the maximum gas temperature is optimized.

12. The method according to claim 8, wherein engine parameters are controlled such that a maximum gas temperature in the combustion chamber and a duration at the maximum gas temperature is optimized.

13. The system according to claim 11, wherein the engine parameters are selected from the group consisting of: EGR-rate, amount of injection per cycle, fuel amount and injection timing.

14. The system according to claim 8, wherein minimizing the mean gas temperature of the combustion chamber of said engine before the ignition of the second injection by controlling the dwell time between the first injection and the second injection comprises decreasing the dwell time between the first injection and the second injection.

* * * * *